US012602816B2

(12) United States Patent
Chen et al.

(10) Patent No.: US 12,602,816 B2
(45) Date of Patent: Apr. 14, 2026

(54) SIMULATED CONFIGURATION EVALUATION APPARATUS AND METHOD

(71) Applicant: HTC Corporation, Taoyuan City (TW)

(72) Inventors: Yan-Ru Chen, Taoyuan City (TW);
Fang Yu Cheng, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 163 days.

(21) Appl. No.: 18/597,939

(22) Filed: Mar. 7, 2024

(65) Prior Publication Data

US 2025/0014205 A1 Jan. 9, 2025

Related U.S. Application Data

(60) Provisional application No. 63/511,690, filed on Jul. 3, 2023.

(51) Int. Cl.
G06T 7/70 (2017.01)
G06T 19/00 (2011.01)

(52) U.S. Cl.
CPC ................ G06T 7/70 (2017.01); G06T 19/00 (2013.01)

(58) Field of Classification Search
CPC .................................. G06T 7/70; G06T 19/00
USPC ......................................................... 345/419
See application file for complete search history.

(56) References Cited

U.S. PATENT DOCUMENTS

| | | | | |
|---|---|---|---|---|
| 2007/0109296 A1* | 5/2007 | Sakagawa | ............... | G06T 19/00 |
| | | | | 345/419 |
| 2016/0092031 A1 | 3/2016 | Chen | | |
| 2022/0148247 A1* | 5/2022 | Bashkirov | ............... | G06T 7/174 |

FOREIGN PATENT DOCUMENTS

| | | | | |
|---|---|---|---|---|
| CN | 106164821 A | | 11/2016 | |
| CN | 115390677 | * | 11/2022 | ............... G06F 3/01 |
| CN | 115390677 A | | 11/2022 | |
| CN | 115515475 A | | 12/2022 | |
| TW | 200828043 A | | 7/2008 | |

OTHER PUBLICATIONS

The office action of the corresponding Taiwanese application No. TW113123020 isssued on Jan. 24, 2025.

* cited by examiner

*Primary Examiner* — Hai Tao Sun
(74) *Attorney, Agent, or Firm* — CKC & Partners Co., LLC

(57) ABSTRACT

A simulated configuration evaluation apparatus is provided. The apparatus generates a virtual three-dimensional object placed in a first simulated pose based on a virtual three-dimensional object model in a virtual space, the virtual three-dimensional object includes transmitters, the transmitters are set on the virtual three-dimensional object in a first configuration, and the transmitters are configured to transmit a plurality of first signals. The apparatus receives second signals from the transmitters based on a viewpoint in the virtual space. The apparatus calculates a first estimated pose of the virtual three-dimensional object in the virtual space based on the second signals. The apparatus compares the first estimated pose and the first simulated pose to generate a first evaluating score corresponding to the first configuration.

20 Claims, 5 Drawing Sheets

200 generating, in a virtual space, a virtual three-dimensional object placed in a first simulated pose based on the virtual three-dimensional object model, wherein the virtual three-dimensional object comprises a plurality of transmitters, the transmitters are set on the virtual three-dimensional object in a first configuration, and the transmitters are configured to transmit a plurality of first signals ∼ S21 receiving a plurality of second signals from the transmitters based on a viewpoint in the virtual space ∼ S22 calculating a first estimated pose of the virtual three-dimensional object in the virtual space based on the second signals ∼ S23 comparing the first estimated pose and the first simulated pose to generate a first evaluating score corresponding to the first configuration ∼ S24

SIMULATED CONFIGURATION EVALUATION APPARATUS AND METHOD

CROSS-REFERENCE TO RELATED APPLICATION

This application claims priority to U.S. Provisional Application Ser. No. 63/511,690, filed Jul. 3, 2023, which is herein incorporated by reference in its entirety.

BACKGROUND

Field of Invention

The present disclosure relates to a simulated configuration evaluation apparatus and method. More particularly, the present disclosure relates to simulated configuration evaluation apparatus and method for the signal source configuration on trackable objects.

Description of Related Art

When it comes to designing trackable objects, multiple signal sources such as infrared (IR) transmitters, ultrasound transmitters, or light-emitting diodes (LED) can be placed on a trackable object, and a tracking system can recognize the position and the pose (e.g., orientation) of the trackable object by using a receiver receiving the signals from the signal sources.

However, when configuring the signal sources, it is hard to make sure how to place the signal sources to ensure that the tracking system is able to determine the pose of the trackable object through the signal position combination. At the same time, it is necessary to avoid the scenario where trackable objects with different poses present the same signal position combination, or the signal source is obscured in certain poses.

In addition, when the spacing between multiple signal sources is lengthened, the cost of the tracking calculation of the trackable object will also increase. In contrast, when the spacing between the signal sources is shortened, interference between signals is more likely to occur.

In view of this, how to simulate the signal combination received by the tracking system under different poses of the trackable object with specific signal source configuration, and further evaluate the tracking effectiveness of the signal source configuration is the goal that the industry strives to work on.

SUMMARY

The disclosure provides a simulated configuration evaluation apparatus comprises a storage and a processor. The storage is configured to store a virtual three-dimensional object model. The processor is configured to execute the following operations: generating a virtual three-dimensional object placed in a first simulated pose based on the virtual three-dimensional object model in a virtual space, wherein the virtual three-dimensional object comprises a plurality of transmitters, the transmitters are set on the virtual three-dimensional object in a first configuration, and the transmitters are configured to transmit a plurality of first signals; receiving a plurality of second signals from the transmitters based on a viewpoint in the virtual space; calculating a first estimated pose of the virtual three-dimensional object in the virtual space based on the second signals; and comparing the first estimated pose and the first simulated pose to generate a first evaluating score corresponding to the first configuration.

The disclosure also provides a simulated configuration evaluation method adapted for use in an electronic apparatus. The simulated configuration evaluation method comprises: generating a virtual three-dimensional object placed in a first simulated pose based on the virtual three-dimensional object model in a virtual space, wherein the virtual three-dimensional object comprises a plurality of transmitters, the transmitters are set on the virtual three-dimensional object in a first configuration, and the transmitters are configured to transmit a plurality of first signals; receiving a plurality of second signals from the transmitters based on a viewpoint in the virtual space; calculating a first estimated pose of the virtual three-dimensional object in the virtual space based on the second signals; and comparing the first estimated pose and the first simulated pose to generate a first evaluating score corresponding to the first configuration.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
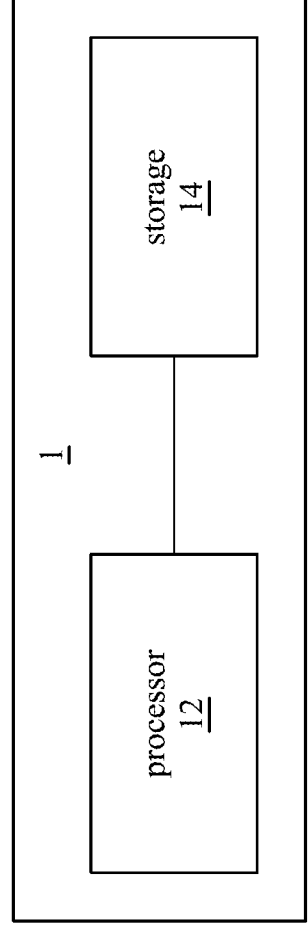
FIG. 1 is a schematic diagram illustrating a simulated configuration evaluation apparatus according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a simulated configuration evaluation apparatus 1 according to the first embodiments of the present disclosure. The simulated configuration evaluation apparatus 1 comprises a processor 12 and a storage 14. The storage 14 is configured to store a virtual three-dimensional object model, wherein the virtual three-dimensional object model can be a three-dimensional model file of a trackable object, e.g., a computer-aided design (CAD) file of a controller in a virtual reality system. In some embodiments, the storage 14 can also store multiple virtual three-dimensional object models to provide the user simulating trackable objects in different shapes.

Figure 2:
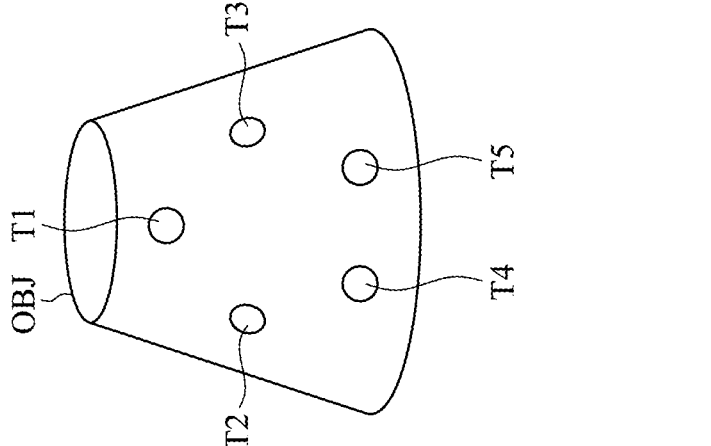
FIG. 2 is a schematic diagram illustrating a virtual three-dimensional object according to some embodiments of the present disclosure.

For example, reference is made to FIG. 2. FIG. 2 is a schematic diagram illustrating a virtual three-dimensional object OBJ according to some embodiments of the present disclosure. The virtual three-dimensional object OBJ is a virtual three-dimensional object generated based on the virtual three-dimensional object model. The virtual three-dimensional object OBJ is roughly in the shape of a truncated cone, and 5 transmitters T1, T2, T3, T4, and T5 are set on the curved surface of the virtual three-dimensional object OBJ. The transmitters T1-T5 is configured to transmit signals to provide other apparatus (e.g., the head-mounted display of the virtual reality system) to track the pose of the virtual three-dimensional object OBJ after receiving the signals.

It is noted that, the shape of the virtual three-dimensional object OBJ shown in FIG. 2 is used for illustration, but is not limited thereto. The simulated configuration evaluation apparatus 1 can adjust the shape of the virtual three-dimensional object OBJ based on practical requirements.

The transmitters T1-T5 can be implemented in multiple ways, e.g., infrared light-emitting diodes, ultrasonic transducers, sonar transducers, electromagnetic transmitters, etc. It is noted that, although the virtual three-dimensional object OBJ is a virtual model, if the signal type transmitted by the transmitters T1-T5 is different, the subsequent simulation method will also be different. Details about the signal simulation will be illustrated in the following paragraphs.

In some embodiments, the transmitters T1-T5 can transmit identical signals (e.g., lights with the same frequencies) or different signals (e.g., lights with different frequencies) to provide the tracking system recognizing each of the transmitters via the signals.

In some embodiments, the processor 12 can comprise a central processing unit (CPU), a graphics processing unit (GPU), a multi-processor, a distributed processing system, an application specific integrated circuit (ASIC), and/or a suitable processing unit.

In some embodiments, the storage 14 can comprise a semiconductor or solid-state memory, a magnetic tape, a removable computer diskette, a random-access memory (RAM), a read-only memory (ROM), a rigid magnetic disk, and/or an optical disk.

The simulated configuration evaluation apparatus 1 is configured to simulate operating scenarios of different transmitter configurations on the virtual three-dimensional object OBJ and further evaluate the tracking effects of the transmitter configurations. Specifically, the simulated configuration evaluation apparatus 1 is configured to execute the following operations.

First, the processor 12 of the simulated configuration evaluation apparatus 1 generates the virtual three-dimensional object OBJ placed in a first simulated pose in a virtual space based on the virtual three-dimensional object model, wherein the transmitters T1-T5 of the virtual three-dimensional object OBJ are configured to transmit a plurality of first signals.

Next, the processor 12 of the simulated configuration evaluation apparatus 1 receives a plurality of second signals from the transmitters T1-T5 based on a viewpoint in the virtual space.

Next, the processor 12 of the simulated configuration evaluation apparatus 1 calculates a first estimated pose of the virtual three-dimensional object OBJ in the virtual space based on the second signals.

Finally, the processor 12 of the simulated configuration evaluation apparatus 1 compares the first estimated pose and the first simulated pose to generate a first evaluating score corresponding to the first configuration.

Figure 3:
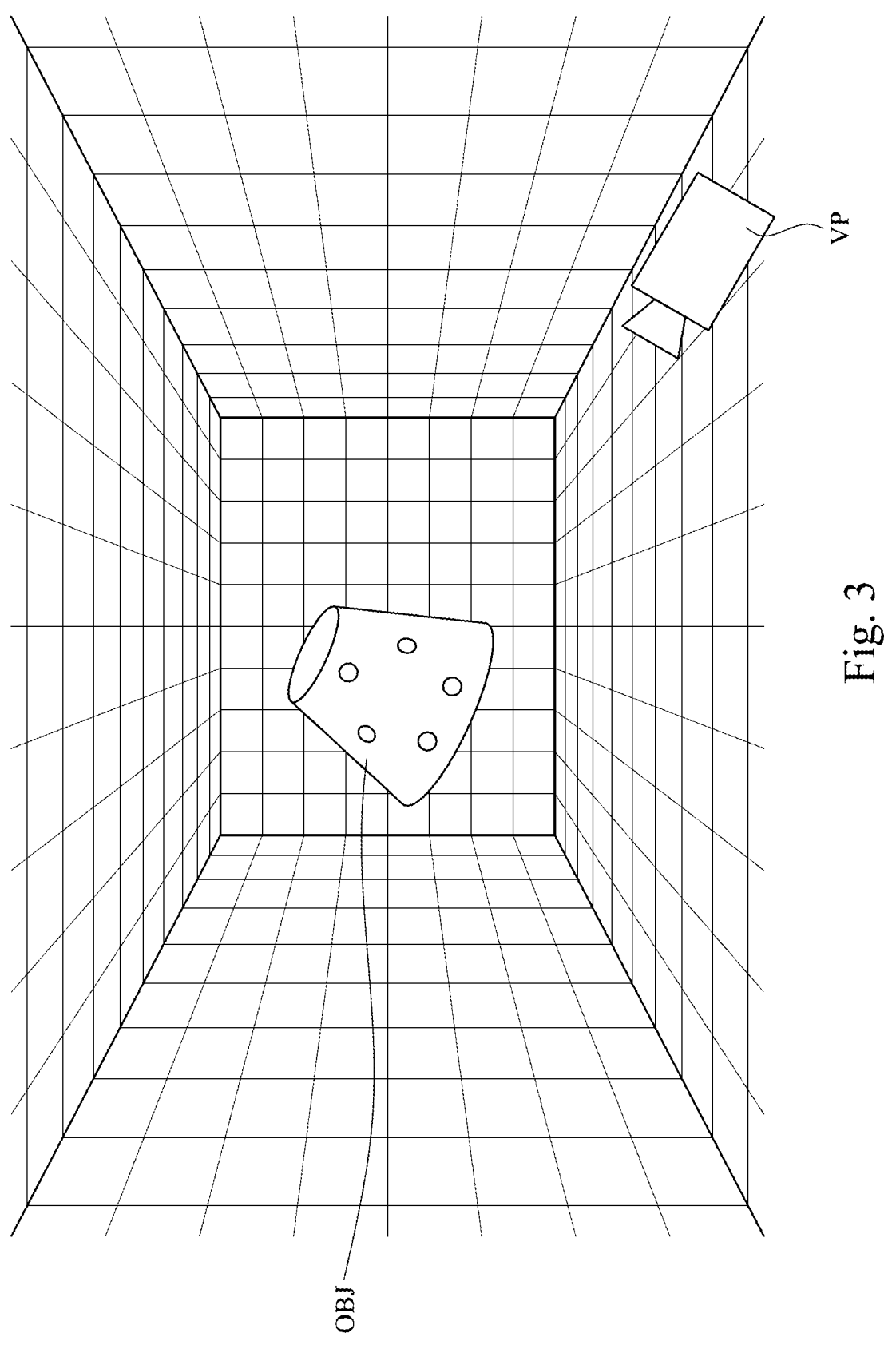
FIG. 3 is a schematic diagram illustrating observing the virtual three-dimensional object in a virtual space from a viewpoint according to some embodiments of the present disclosure.

Regarding to the specific operations, please refer to FIG. 3. FIG. 3 is a schematic diagram illustrating observing the virtual three-dimensional object OBJ in a virtual space from a viewpoint VP according to some embodiments of the present disclosure. As shown in FIG. 3, the virtual three-dimensional object OBJ is placed in a first simulated pose in the virtual space generated by the processor 12, and a certain distance exists between the viewpoint VP and the virtual three-dimensional object OBJ in the virtual space.

Additionally, the simulated configuration evaluation apparatus 1 further simulates the first signals transmitted by the transmitters T1-T5. Specifically, the simulated configuration evaluation apparatus 1 simulates the transmission direction, the transmission range, the transmission speed, etc. of the signals based on the type of the transmitters T1-T5. For example, assume that the transmitters T1-T5 are infrared light-emitting diodes, the first signals have characteristics such as the speed, the rectilinear propagation, the scattering, the interference of light waves. For ease of illustrating, the transmitters T1-T5 of the virtual three-dimensional object OBJ are illustrated as infrared light-emitting diodes in this embodiment, however the present disclosure is not limited to this.

In some embodiments, the processor 12 can simulate a receiver such as a camera, a microphone, or a transducer configured at the viewpoint VP to receive signals transmitted by the transmitters T1-T5 of the virtual three-dimensional object OBJ. In this embodiment, the processor 12 simulates an infrared camera configured at the viewpoint VP to receive infrared signals transmitted by the transmitters T1-T5.

Figure 4:
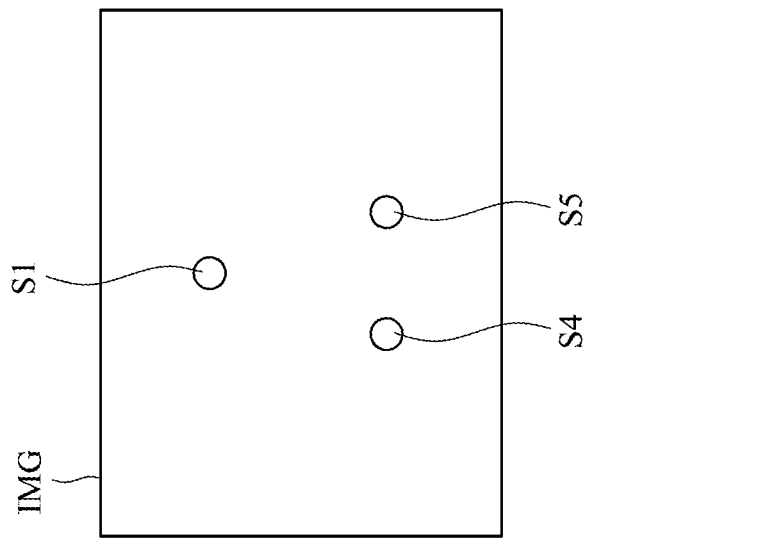
FIG. 4 is a schematic diagram illustrating an image generated after the receiving the signals at the viewpoint according to some embodiments of the present disclosure.

An image IMG generated after the processor 12 simulates receiving the signals transmitted by the transmitters T1-T5 at the viewpoint VP is illustrated in FIG. 4. As shown in FIG. 4, since the infrared signals (i.e., the first signals) transmitted by the transmitters T1-T5 have the property of rectilinear propagation, part of the signals, 3 infrared signals S1, S4, and S5 (i.e., the second signals), are received in the image IMG are respectively corresponding to each of the transmitters T1, T4, and T5, wherein the signal emission directions of the transmitters T1, T4, and T5 are relatively toward the viewpoint VP. On the other hand, since the transmitters T2 and T3 are configured on the curved surface of the virtual three-dimensional object OBJ, and the corresponding signal emission directions are not facing the viewpoint VP, the infrared signals transmitted by the transmitters T2 and T3 are not able to be received at the viewpoint VP and displayed in the image IMG.

Furthermore, the processor 12 can estimate the pose of the virtual three-dimensional object OBJ based on the image IMG. Specifically, since the configuring position of the transmitters T1-T5 on the virtual three-dimensional object OBJ is known, the processor 12 can calculate the relative position relationship between the transmitters T1-T5 in the virtual space based on the first signals in the image IMG, thereby estimating the pose of the virtual three-dimensional object OBJ in the virtual space based on the relative position relationship, wherein the pose comprising the coordinate and the orientation of the virtual three-dimensional object OBJ in the virtual space.

When the processor 12 determines the positions of the transmitters T1-T5, the processor 12 can select corresponding calculation method based on the signal type of the second signals. For example, if the transmitters T1-T5 are infrared light-emitting diodes, the processor 12 can perform estimation by using perspective-n-point (PnP) algorithm correspondingly; if the transmitters T1-T5 are ultrasonic transducers, the processor 12 can utilize the characteristic of sound wave transmission speed and perform estimation based on the receiving time of the second signals by using Time Difference of Arrival (TDoA) algorithm correspondingly; if the transmitters T1-T5 are sonar transducers, the processor 12 can utilize the characteristic of sound wave transmission speed and perform estimation based on the receiving time of the second signals by using Time of Flight (ToF) algorithm correspondingly; and if the transmitters T1-T5 are electromagnetic transmitters, the processor 12 can simulate a magnetometer at the viewpoint VP and calculate the strength of magnetic field to position the transmitters T1-T5, thereby estimating the pose of the virtual three-dimensional object OBJ based on the transmitters T1-T5.

In some embodiments, the simulated configuration evaluation apparatus 1 can consider the interference between multiple signals transmitted by the transmitters based on different types and configurations of the transmitters, e.g., the interference between sound waves and/or light waves. Accordingly, the simulated configuration evaluation apparatus 1 can simulate the operations of the tracking system closer to actual scenarios.

Finally, the processor 12 compares the estimated pose of the virtual three-dimensional object OBJ and the simulated pose of the virtual three-dimensional object OBJ being placed. The closer the estimated pose and the simulated pose, the higher the tracking effectiveness of the configuration of the transmitters T1-T5 on the virtual three-dimensional object OBJ. Namely, the higher the accuracy of the tracking system determining the pose of the virtual three-dimensional object OBJ based on the configuration, correspondingly, the higher the first evaluating score generated by the processor 12. In contrast, the larger the difference between the estimated pose and the pose of the virtual three-dimensional object OBJ being simulated, indicating that the lower the tracking effectiveness of the configuration of the transmitters T1-T5 on the virtual three-dimensional object OBJ, correspondingly, the lower the first evaluating score generated by the processor 12.

In some embodiments, in response to the difference between the first estimated pose and the first simulated pose lower than a threshold, the processor 12 increases the first evaluating score; and in response to the difference between the first estimated pose and the first simulated pose higher than the threshold, the processor 12 does not increase the first evaluating score.

In some embodiments, the simulated configuration evaluation apparatus 1 can further simulate the virtual three-dimensional object OBJ in multiple different poses and then evaluate the tracking effectiveness of the configuration of the transmitters T1-T5 through similar operations mentioned above. Accordingly, the simulated configuration evaluation apparatus 1 can then evaluate the tracking effectiveness of the configuration of the transmitters T1-T5 when the virtual three-dimensional object OBJ assumes different poses.

Specifically, the simulated configuration evaluation apparatus 1 can implement the function mentioned above through the following operations. After the processor 12 adjusts the virtual three-dimensional object OBJ to be placed in a second simulated pose, the processor 12 receives a plurality of third signals from the transmitters T1-T5 based on the viewpoint VP, wherein the third signals are generated by the virtual three-dimensional object OBJ placed in a second simulated pose; the processor 12 calculates a second estimated pose of the virtual three-dimensional object OBJ in the virtual space based on the third signals; and the processor

12 compares the second estimated pose and the second simulated pose to adjust the first evaluating score.

For example, the simulated configuration evaluation apparatus 1 can simulate poses of the virtual three-dimensional object OBJ at multiple different rotation angles in a three-dimensional space, e.g., the simulated configuration evaluation apparatus 1 can simulate poses of the virtual three-dimensional object OBJ at 0, 30, 60, 90, 120, 150, 180, 210, 240, 270, 300, and 330 degrees of rotation angles respectively on three axes. Accordingly, the simulated configuration evaluation apparatus 1 can simulate 12*12*12, i.e., 1728, poses.

Furthermore, the simulated configuration evaluation apparatus 1 then evaluate the tracking effectiveness of the configuration of the transmitters T1-T5 through the operations mentioned above, wherein when comparing the estimated pose and the simulated pose, if the difference between the estimated pose and the simulated pose is lower than a threshold (e.g., the angle difference of 3 axes is lower than 20 degrees), then the evaluating score is increased by 1; in contrast, if the difference is not lower than the threshold, then the evaluating score will not be increased. Through the operations mentioned above, the simulated configuration evaluation apparatus 1 can generate evaluating scores corresponding to the configurations of the transmitters T1-T5 on the virtual three-dimensional object OBJ.

In some embodiments, the simulated configuration evaluation apparatus 1 can further set the transmitters on the virtual three-dimensional object OBJ in different numbers and/or on different positions and generate evaluating scores through the operations mentioned above, thereby evaluating the tracking effectiveness of different transmitter configurations on the virtual three-dimensional object OBJ.

Specifically, the simulated configuration evaluation apparatus 1 can implement the function mentioned above through the following operations. After the processor 12 adjusts the positions of the transmitters T1-T5 on the virtual three-dimensional object OBJ based on a second configuration, the processor 12 receives a plurality of fourth signals from the transmitters T1-T5 set on the virtual three-dimensional object OBJ in a second configuration based on the viewpoint VP in the virtual space; the processor 12 calculates a third estimated pose of the virtual three-dimensional object OBJ in the virtual space based on the fourth signals; and the processor 12 compares the third estimated pose and the first simulated pose to generate a second evaluating score corresponding to the second configuration.

Furthermore, the simulated configuration evaluation apparatus 1 can select a transmitter configuration with a higher evaluating score by comparing the first evaluating score and the second evaluating score.

In some embodiments, the simulated configuration evaluation apparatus 1 can also generate an optimized transmitter configuration based on the estimated pose and the simulated pose by using a reinforcement learning model. By exploiting the feature of learning from trial-and-error of the reinforcement learning model, a transmitter configuration with a higher tracking effectiveness can be generated via multiple epochs.

Specifically, the simulated configuration evaluation apparatus 1 can implement the function mentioned above through the following operations. The processor 12 generates a third configuration based on the first estimated pose and the first simulated pose by using a reinforcement learning model, wherein the difference between the first simulated pose and a fourth estimated pose of the third configuration corresponding to the first simulated pose is lower than the difference between the first estimated pose and the first simulated pose. Namely, the estimated pose corresponding to the transmitter configuration generated by the reinforcement learning model can be closer to the simulated pose than the estimated pose corresponding to the original transmitter configuration.

In some embodiments, the simulated configuration evaluation apparatus 1 can also simulate an obstacle blocking a transmitter signal in the virtual space. For example, since the user's finger or other part of the body may block the transmitter signal during operating the controller of the virtual reality system, the simulated configuration evaluation apparatus 1 can generate an obstacle at the position where obstacles are likely to appear (e.g., the position of the user's finger when holding the controller) to simulate operating scenarios. Furthermore, the simulated configuration evaluation apparatus 1 can then simulate signal tracking scenarios where the signal is blocked by the obstacle and further evaluate the transmitter configuration.

Specifically, in the operation of receiving the second signals from the transmitters, the simulated configuration evaluation apparatus 1 can further implement the function mentioned above through the following operations. The processor 12 generates an obstacle in the virtual space, wherein the obstacle blocks one of the first signals transmitted by the transmitters T1-T5; and the processor 12 receives the second signals from the transmitters T1-T5 based on the viewpoint VP in the virtual space, wherein the second signals are part of the first signals.

In summary, the simulated configuration evaluation apparatus 1 provided by the present disclosure can simulate a tracking scenario of a specific transmitter configuration on a trackable object and further evaluate the transmitter configuration based on the result of the simulation. Furthermore, by simulating trackable objects with different poses, the simulated configuration evaluation apparatus 1 can adjust simulated configurations for configurations and/or tracking scenarios that are prone to misjudgment. Also, the simulated configuration evaluation apparatus 1 can also simulate an obstacle in the space to make the simulation operations closer to real-life scenarios. In some embodiments, the simulated configuration evaluation apparatus 1 can also optimize the transmitter configuration by using a reinforcement learning model after multiple epochs.

Figure 5:
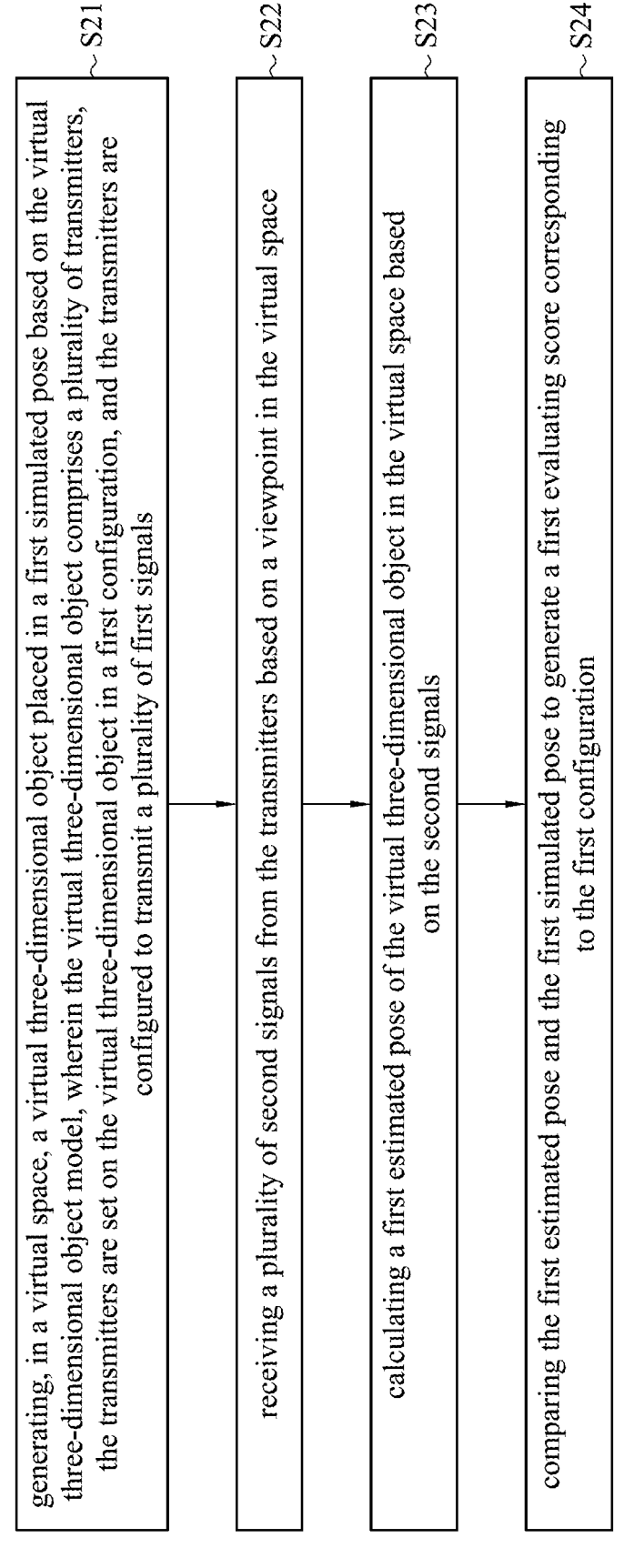
FIG. 5 is a flow diagram illustrating a simulated configuration evaluation method according to a second embodiment of the present disclosure.

Reference is made to FIG. 5. FIG. 5 is a flow diagram illustrating a simulated configuration evaluation method 200 according to a second embodiment of the present disclosure. The simulated configuration evaluation method 200 comprises steps S21-S24. The simulated configuration evaluation method 200 is configured to simulate operating scenarios of different transmitter configurations on a virtual three-dimensional object and further evaluate the tracking effectiveness of the transmitter configurations. The simulated configuration evaluation method 200 can be executed by an electronic apparatus (e.g., the simulated configuration evaluation apparatus 1 shown in FIG. 1).

First, in the step S21, the electronic apparatus generates a virtual three-dimensional object placed in a first simulated pose based on the virtual three-dimensional object model in a virtual space, wherein the virtual three-dimensional object comprises a plurality of transmitters, the transmitters are set on the virtual three-dimensional object in a first configuration, and the transmitters are configured to transmit a plurality of first signals.

Next, in the step S22, the electronic apparatus receives a plurality of second signals from the transmitters based on a viewpoint in the virtual space.

Next, in the step S23, the electronic apparatus calculates a first estimated pose of the virtual three-dimensional object in the virtual space based on the second signals.

Finally, in the step S24, the electronic apparatus compares the first estimated pose and the first simulated pose to generate a first evaluating score corresponding to the first configuration.

In some embodiments, the step of calculating the first estimated pose further comprises calculating a relative position relationship between the transmitters based on a plurality of receiving positions of the second signals; and calculating the first estimated pose based on the relative position relationship.

In some embodiments, the step of calculating the first estimated pose further comprises calculating a relative position relationship between the transmitters based on a plurality of receiving time of the second signals; and calculating the first estimated pose based on the relative position relationship.

In some embodiments, the step of comparing the first estimated pose and the first simulated pose to generate the first evaluating score further comprises in response to the difference between the first estimated pose and the first simulated pose lower than a threshold, increasing the first evaluating score; and in response to the difference between the first estimated pose and the first simulated pose higher than the threshold, not increasing the first evaluating score.

In some embodiments, the simulated configuration evaluation method 200 further comprises receiving a plurality of third signals from the transmitters based on the viewpoint in the virtual space, wherein the third signals are generated by the virtual three-dimensional object placed in a second simulated pose; calculating a second estimated pose of the virtual three-dimensional object in the virtual space based on the third signals; and comparing the second estimated pose and the second simulated pose to adjust the first evaluating score.

In some embodiments, the step of comparing the second estimated pose and the second simulated pose to adjust the first evaluating score further comprises in response to the difference between the second estimated pose and the second simulated pose lower than a threshold, increasing the first evaluating score; and in response to the difference between the second estimated pose and the second simulated pose higher than the threshold, not increasing the first evaluating score.

In some embodiments, the simulated configuration evaluation method 200 further comprises receiving a plurality of fourth signals from the transmitters set on the virtual three-dimensional object in a second configuration based on the viewpoint in the virtual space; calculating a third estimated pose of the virtual three-dimensional object in the virtual space based on the fourth signals; and comparing the third estimated pose and the first simulated pose to generate a second evaluating score corresponding to the second configuration.

In some embodiments, the simulated configuration evaluation method 200 further comprises selecting one of the first configuration and the second configuration based on the first evaluating score and the second evaluating score.

In some embodiments, the simulated configuration evaluation method 200 further comprises generating a third configuration based on the first estimated pose and the first simulated pose by using a reinforcement learning model, wherein the difference between the first simulated pose and a fourth estimated pose of the third configuration corresponding to the first simulated pose is lower than the difference between the first estimated pose and the first simulated pose.

In some embodiments, the step of receiving the second signals from the transmitters further comprises generating an obstacle in the virtual space, wherein the obstacle blocks one of the first signals transmitted by the transmitters; and receiving the second signals from the transmitters based on the viewpoint in the virtual space, wherein the second signals are part of the first signals.

In summary, the simulated configuration evaluation method 200 provided by the present disclosure can simulate a tracking scenario of a specific transmitter configuration on a trackable object and further evaluate the transmitter configuration based on the result of the simulation. Furthermore, by simulating trackable objects with different poses, the simulated configuration evaluation method 200 can adjust simulated configurations for configurations and/or tracking scenarios that are prone to misjudgment. Also, the simulated configuration evaluation method 200 can also simulate an obstacle in the space to make the simulation operations closer to real-life scenarios. In some embodiments, the simulated configuration evaluation method 200 can also optimize the transmitter configuration by using a reinforcement learning model after multiple epochs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A simulated configuration evaluation apparatus, comprising:
   a storage, configured to store a virtual three-dimensional object model; and
   a processor, configured to execute the following operations:
      generating, in a virtual space, a virtual three-dimensional object placed in a first simulated pose based on the virtual three-dimensional object model, wherein the virtual three-dimensional object comprises a plurality of transmitters, the transmitters are set on the virtual three-dimensional object in a first configuration, and the transmitters are configured to transmit a plurality of first signals;
      receiving a plurality of second signals from the transmitters based on a viewpoint in the virtual space;
      calculating a first estimated pose of the virtual three-dimensional object in the virtual space based on transmission directions, transmission ranges and transmission speeds of the second signals transmitted in the virtual space from the transmitters respectively; and
      comparing the first estimated pose and the first simulated pose to generate a first evaluating score corresponding to the first configuration.

2. The simulated configuration evaluation apparatus of claim 1, wherein the operation of calculating the first estimated pose further comprising:

calculating a relative position relationship between the transmitters based on a plurality of receiving positions of the second signals; and
calculating the first estimated pose based on the relative position relationship.

3. The simulated configuration evaluation apparatus of claim 1, wherein the operation of calculating the first estimated pose further comprising:
   calculating a relative position relationship between the transmitters based on a plurality of receiving time of the second signals; and
   calculating the first estimated pose based on the relative position relationship.

4. The simulated configuration evaluation apparatus of claim 1, wherein the operation of comparing the first estimated pose and the first simulated pose to generate the first evaluating score further comprising:
   in response to the difference between the first estimated pose and the first simulated pose lower than a threshold, increasing the first evaluating score; and
   in response to the difference between the first estimated pose and the first simulated pose higher than the threshold, not increasing the first evaluating score.

5. The simulated configuration evaluation apparatus of claim 1, wherein the processor is further configured to execute the following operations:
   receiving a plurality of third signals from the transmitters based on the viewpoint in the virtual space, wherein the third signals are generated by the virtual three-dimensional object placed in a second simulated pose;
   calculating a second estimated pose of the virtual three-dimensional object in the virtual space based on the third signals; and
   comparing the second estimated pose and the second simulated pose to adjust the first evaluating score.

6. The simulated configuration evaluation apparatus of claim 5, wherein the operation of comparing the second estimated pose and the second simulated pose to adjust the first evaluating score further comprising:
   in response to the difference between the second estimated pose and the second simulated pose lower than a threshold, increasing the first evaluating score; and
   in response to the difference between the second estimated pose and the second simulated pose higher than the threshold, not increasing the first evaluating score.

7. The simulated configuration evaluation apparatus of claim 1, wherein the processor is further configured to execute the following operations:
   receiving a plurality of fourth signals from the transmitters set on the virtual three-dimensional object in a second configuration based on the viewpoint in the virtual space;
   calculating a third estimated pose of the virtual three-dimensional object in the virtual space based on the fourth signals; and
   comparing the third estimated pose and the first simulated pose to generate a second evaluating score corresponding to the second configuration.

8. The simulated configuration evaluation apparatus of claim 7, wherein the processor is further configured to execute the following operation:
   selecting one of the first configuration and the second configuration based on the first evaluating score and the second evaluating score.

9. The simulated configuration evaluation apparatus of claim 1, wherein the processor is further configured to execute the following operation:

generating a third configuration based on the first estimated pose and the first simulated pose by using a reinforcement learning model, wherein the difference between the first simulated pose and a fourth estimated pose of the third configuration corresponding to the first simulated pose is lower than the difference between the first estimated pose and the first simulated pose.

10. The simulated configuration evaluation apparatus of claim 1, wherein the operation of receiving the second signals from the transmitters further comprising:

generating an obstacle in the virtual space, wherein the obstacle blocks one of the first signals transmitted by the transmitters; and receiving the second signals from the transmitters based on the viewpoint in the virtual space, wherein the second signals are part of the first signals.

11. A simulated configuration evaluation method, being adapted for use in an electronic apparatus, comprising:

generating, in a virtual space, a virtual three-dimensional object placed in a first simulated pose based on the virtual three-dimensional object model, wherein the virtual three-dimensional object comprises a plurality of transmitters, the transmitters are set on the virtual three-dimensional object in a first configuration, and the transmitters are configured to transmit a plurality of first signals;

receiving a plurality of second signals from the transmitters based on a viewpoint in the virtual space;

calculating a first estimated pose of the virtual three-dimensional object in the virtual space based on transmission directions, transmission ranges and transmission speeds of the second signals transmitted in the virtual space from the transmitters respectively; and comparing the first estimated pose and the first simulated pose to generate a first evaluating score corresponding to the first configuration.

12. The simulated configuration evaluation method of claim 11, wherein the step of calculating the first estimated pose further comprising:

calculating a relative position relationship between the transmitters based on a plurality of receiving positions of the second signals; and calculating the first estimated pose based on the relative position relationship.

13. The simulated configuration evaluation method of claim 11, wherein the step of calculating the first estimated pose further comprising:

calculating a relative position relationship between the transmitters based on a plurality of receiving time of the second signals; and calculating the first estimated pose based on the relative position relationship.

14. The simulated configuration evaluation method of claim 11, wherein the step of comparing the first estimated pose and the first simulated pose to generate the first evaluating score further comprising:

in response to the difference between the first estimated pose and the first simulated pose lower than a threshold, increasing the first evaluating score; and in response to the difference between the first estimated pose and the first simulated pose higher than the threshold, not increasing the first evaluating score.

15. The simulated configuration evaluation method of claim 11, further comprising:

receiving a plurality of third signals from the transmitters based on the viewpoint in the virtual space, wherein the third signals are generated by the virtual three-dimensional object placed in a second simulated pose;

calculating a second estimated pose of the virtual three-dimensional object in the virtual space based on the third signals; and comparing the second estimated pose and the second simulated pose to adjust the first evaluating score.

16. The simulated configuration evaluation method of claim 15, wherein the step of comparing the second estimated pose and the second simulated pose to adjust the first evaluating score further comprising:

in response to the difference between the second estimated pose and the second simulated pose lower than a threshold, increasing the first evaluating score; and in response to the difference between the second estimated pose and the second simulated pose higher than the threshold, not increasing the first evaluating score.

17. The simulated configuration evaluation method of claim 11, further comprising:

receiving a plurality of fourth signals from the transmitters set on the virtual three-dimensional object in a second configuration based on the viewpoint in the virtual space;

calculating a third estimated pose of the virtual three-dimensional object in the virtual space based on the fourth signals; and comparing the third estimated pose and the first simulated pose to generate a second evaluating score corresponding to the second configuration.

18. The simulated configuration evaluation method of claim 17, further comprising:

selecting one of the first configuration and the second configuration based on the first evaluating score and the second evaluating score.

19. The simulated configuration evaluation method of claim 11, further comprising:

generating a third configuration based on the first estimated pose and the first simulated pose by using a reinforcement learning model, wherein the difference between the first simulated pose and a fourth estimated pose of the third configuration corresponding to the first simulated pose is lower than the difference between the first estimated pose and the first simulated pose.

20. The simulated configuration evaluation method of claim 11, wherein the step of receiving the second signals from the transmitters further comprising:

generating an obstacle in the virtual space, wherein the obstacle blocks one of the first signals transmitted by the transmitters; and receiving the second signals from the transmitters based on the viewpoint in the virtual space, wherein the second signals are part of the first signals.

* * * * *